United States Patent
Ardanaz et al.

(10) Patent No.: US 10,146,287 B2
(45) Date of Patent: Dec. 4, 2018

(54) PROCESSOR POWER MONITORING AND CONTROL WITH DYNAMIC LOAD BALANCING

(71) Applicant: Intel Corporation, Santa Clara, CA (US)

(72) Inventors: Federico Ardanaz, Hillsboro, OR (US); Ian M. Steiner, Hillsboro, OR (US); Jonathan M. Eastep, Portland, OR (US); Richard J. Greco, West Linn, OR (US); Krishnakanth V. Sistla, Beaverton, OR (US); Micah Barany, Portland, OR (US); Andrew J. Herdrich, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 187 days.

(21) Appl. No.: 15/088,531

(22) Filed: Apr. 1, 2016

(65) Prior Publication Data

US 2017/0285710 A1  Oct. 5, 2017

(51) Int. Cl.
*G06F 1/32* (2006.01)
*G06F 1/28* (2006.01)

(52) U.S. Cl.
CPC .............. *G06F 1/28* (2013.01); *G06F 1/3287* (2013.01)

(58) Field of Classification Search
None
See application file for complete search history.

(56) References Cited

U.S. PATENT DOCUMENTS

| | | | | |
|---|---|---|---|---|
| 2002/0194513 A1* | 12/2002 | Ishibashi | ............... | G06F 1/3203 713/300 |
| 2003/0110012 A1 | 6/2003 | Orenstien et al. | | |
| 2005/0154861 A1* | 7/2005 | Arimilli | ................ | G06F 9/5011 712/216 |
| 2006/0282692 A1 | 12/2006 | Oh | | |
| 2008/0189561 A1* | 8/2008 | Singh | .................... | G06F 1/3203 713/300 |
| 2014/0189377 A1* | 7/2014 | Subbareddy | .............. | G06F 9/44 713/300 |
| 2016/0062798 A1 | 3/2016 | Lee et al. | | |

FOREIGN PATENT DOCUMENTS

WO   2009120427 A1   10/2009

OTHER PUBLICATIONS

International Search Report and Written Opinion for International Patent Application No. PCT/US2017/020180, dated May 24, 2017, 14 pages.

* cited by examiner

*Primary Examiner* — Paul Yen
(74) *Attorney, Agent, or Firm* — Jordan IP Law, LLC

(57) ABSTRACT

Apparatus and methods may provide for subscribing a thread to a resource monitor through a machine specific register and subscribing the thread to a class of service through the machine specific register. The resource monitor or the class of service for the thread may be changed without interrupting the thread. The power allocated to the processor core may be changed based on the selected class of service for the thread.

19 Claims, 3 Drawing Sheets

PROCESSOR POWER MONITORING AND CONTROL WITH DYNAMIC LOAD BALANCING

GOVERNMENT INTEREST STATEMENT

This invention was made with Government support under contract number B609815 awarded by the Department of Energy. The Government has certain rights in this invention.

TECHNICAL FIELD

Embodiments generally relate to power monitoring and control with dynamic load balancing and monitoring and controlling energy usage across different software entities such as processes or virtual machines. More particularly, embodiments relate dynamic load balancing among processor cores in uses such as distributed computing systems.

BACKGROUND

An application may be divided into various tasks that may be subdivided into groups of related subtasks (e.g., threads) which may be run in parallel on a computational resource. Related threads may be processed in parallel with one another on different components (or different cores within a processor) as "parallel threads," and the completion of a given task may entail the completion of all of the related threads that form the task. Similar performance of each component may reduce wait time for completion of related threads.

Power management of processors may include a power management strategy in which the processors themselves may manage most aspects of their performance and power policy autonomously without the consideration of other processors or other cores within the same processor. Accordingly, completion of related threads may occur at different times with a concomitant overall decrease in performance.

Power management software may take the form of an operating system (OS) power governor or OS driver. Such power management software may react too slowly to create a fine-grained power policy in the processor/processor cores. For apparatus or systems with large numbers of processors, such as servers, performance variation among the processors may lack the performance uniformity assumed by parallel thread processing applications. Further, for large distributed computing systems, variation in processor performance may complicate debugging of applications because it may introduce non-determinism in performance from one application to the next.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
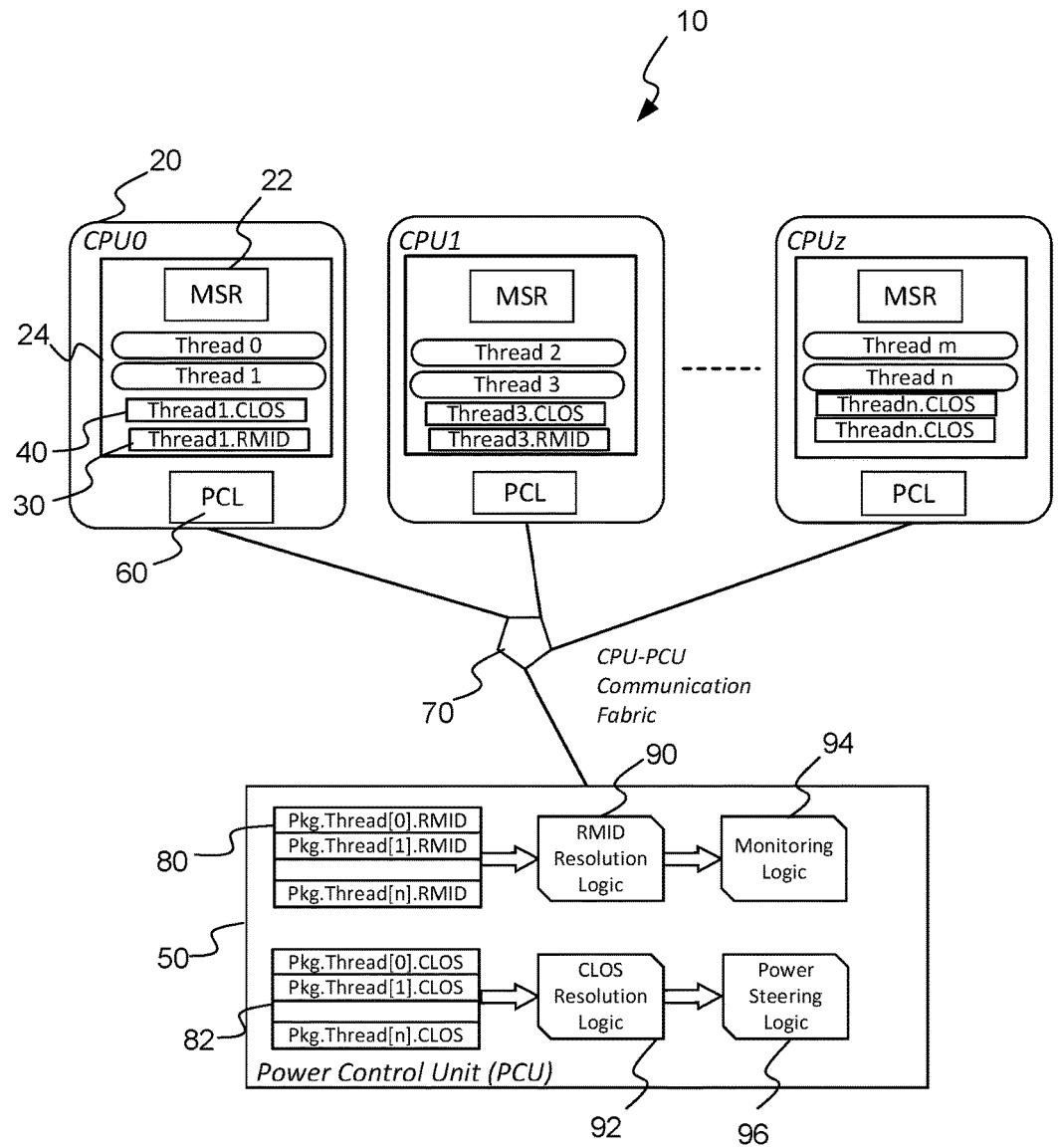
FIG. 1 is a block diagram of an example of a system according to an embodiment.

Turning now to the drawings in detail, FIG. 1 depicts a system 10 that includes multiple processors 20, a power control unit 50, and a communication fabric 70 that facilitates communication between the processors 20 and the power control unit 50. The system 10 may form part of a distributed computing system. The expression "distributed computing system" may relate to a system with networked processors that communicate and coordinate their actions in order to achieve a common goal. In one example, a distributed computing system may utilize component groups to handle work according to various computational topologies and architectures. For example, an application may be divided into various tasks that may be subdivided into groups of related subtasks (e.g., threads), which may be run in parallel on a computational resource.

At the time a new workload such as an application is launched in the system 10, the application may be distributed as various threads that are sent to the processors 20. Each processor 20 may assign a thread to a processor core such as, for example, a processor core 24. In the illustrated example, thread 0 executes in the processor core 24 and thread 1 executes in the same processor core 24. A single core 24 may therefore process multiple application threads or it may process a single application thread. The core 24 processes two application threads in the depicted embodiment. Each processor core 24 may also include a machine specific register (MSR) 22. Through the machine specific register 22, each thread may subscribe to a resource monitor such as resource monitor (RMID) 30 subscribed to by thread 1.

The RMID 30 may provide power measurements or estimates through system software, firmware, or hardware. The RMID 30 may report either a digital estimation of power, a measurement of power from sensors (external to the processor 20 or internal), or some hybrid. In one embodiment, the RMID 30 reports measurements from sensors at voltage regulators and the voltage regulator and sensors are external to the processor (e.g., located on a motherboard). However, the RMID 30 may report measurements from sensors at voltage regulators that may be a mixture of external and internal voltage regulators. In other aspects, the RMID 30 may report digital estimations of power from a model based on activity in different processor resources with activity being measured through event counters. Note that any of the RMID 30 techniques, whether power is reported as an estimate, a measurement from one or more sensors, or a hybrid is applicable for power management in the various embodiments set forth herein.

Energy sampling rates may vary over time as RMID may allow software to create thread groups for energy monitoring. When power samples are taken may be different in time across the threads. For example, when energy may be sampled for RMID-0 may be different than when it may be sampled for RMID-1. Therefore, in an example of energy reporting, 64-bit registers may be used in which the lower 48 bits may contain the sampled energy value encoded using an energy unit defined in a control register. The upper 16 bits may provide a relative time stamp of the moment in time such energy sample was taken. For example, the 16 bits may be the least significant bits of an "always running timer" (ART) driven by a 25 MHz clock. These least significant bits provide about 2 ms of energy reporting range. Software may read the full ART in combination with the energy reported least significant bits to reconstruct an absolute time reference.

Each thread may subscribe to a class of service such as class of service (CLOS) 40 subscribed to by thread 1. Various levels (e.g., four levels), may be provided for a class of service. The CLOS may determine power/performance decisions across threads. In one aspect, a CLOS may be a unit-less power-performance tuning policy value between 0 and 255. The smaller the CLOS 8-bit value, the higher the performance being requested. Thread CLOS subscription may be changed dynamically without interrupting the thread. CLOS policy values may be modified dynamically. The CLOS value may correlate to a processor or core frequency to facilitate dynamic load balancing across processors/cores. Frequency changes, however, may not necessarily be linear with respect to the associated energy consumption as voltage variations associated with different running frequencies introduce a quadratic change in power. Further, increased frequency may not cause a directly proportional performance increase.

System-level machine specific registers (MSRs) may be provided in the power control unit (PCU) 50. For example, the various thread-level RMIDs may be aggregated into a system-level machine specific register 80 while the various thread-level CLOSs may be aggregated into a system level machine specific register 82. Having the system-level MSR and the core-level MSR 22 provides two different MSRs that may define a CLOS or RMID to which a particular thread may be associated. Logic instructions implemented in hardware, configurable logic and/or software may use either the system-level or core-level MSR to associate a thread with a particular RMID or CLOS. If both MSRs are defined in instructions, an override configuration (discussed below in connection with FIGS. 2 and 3) may be used to determine which value is used. Having a core-level MSR such as, for example, the MSR 22, and a system-level MSR such as, for example, the MSR 80, enables various options when assigning threads.

For example, a thread may self-assign itself to a particular RMID and CLOS by writing on its thread-scope MSR CLOS and RMID control registers. This usage model may be integrated into traditional operating systems (OS's) or specialized software.

Alternatively, a software thread may act as a "power manager" agent on behalf of the rest of the system. Such power manager software agents may be able to monitor the power consumption of other threads by grouping them as needed using the RMID binding capability facilitated by the system level RMID MSR 80 and then reading the reported power for each RMID. The same power manager agent may be able to adjust power-performance policies of other threads by writing again into the system-level MSR CLOS register 82.

The system-level RMID MSR 80 may report its monitoring information to RMID resolution logic 90 which ultimately reports to monitoring logic 94. RMID resolution logic 90 and monitoring logic 94 may include fixed-functionality logic hardware, configurable logic, logic instructions (e.g., software), etc., or any combination thereof. Similarly, the system-level CLOS MSR 82 may report its CLOS information to CLOS resolution logic 92 which then reports to power steering logic 96. As with the RMID logic, CLOS resolution logic 92 and power steering logic 96 may include fixed-functionality logic hardware, configurable logic, logic instructions (e.g., software), etc., or any combination thereof.

Power steering logic 96 may use CLOS information to allocate power resources to the various CPU cores 24. Each CPU core may include power control logic (PCL) 60 that implements that power policy determined by the PCU 50. The PCL 60 may also include fixed-functionality logic hardware, configurable logic, logic instructions (e.g., software), etc., or any combination thereof. In one aspect, the PCL 60 may change the frequency of the core 24 in implementing the change of power. As the overall power needs of the system change during processing of one or more applications, the PCU 50 may dynamically balance the power load among the processors/processor cores based on CLOS configuration to meet user demands. The PCL 60 may enforce the dynamic power balancing of the PCU 50 at the core or processor level.

Figure 2:
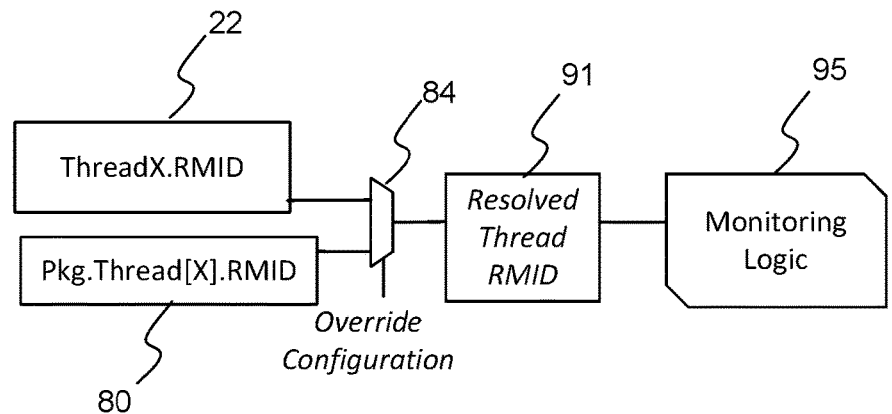
FIG. 2 is a block diagram of an example of resource monitoring logic according to an embodiment.

FIG. 2 depicts resolution of a case in which a core-level machine specific register 22 and a system-level machine specific register 80 both specify an RMID. Both values from the illustrated registers 22 and 80 are passed into a multiplexer 84, which supplies an override configuration. The override configuration may be expressed as a resolved thread RMID 91, which may be sent to monitoring logic 95.

Figure 3:
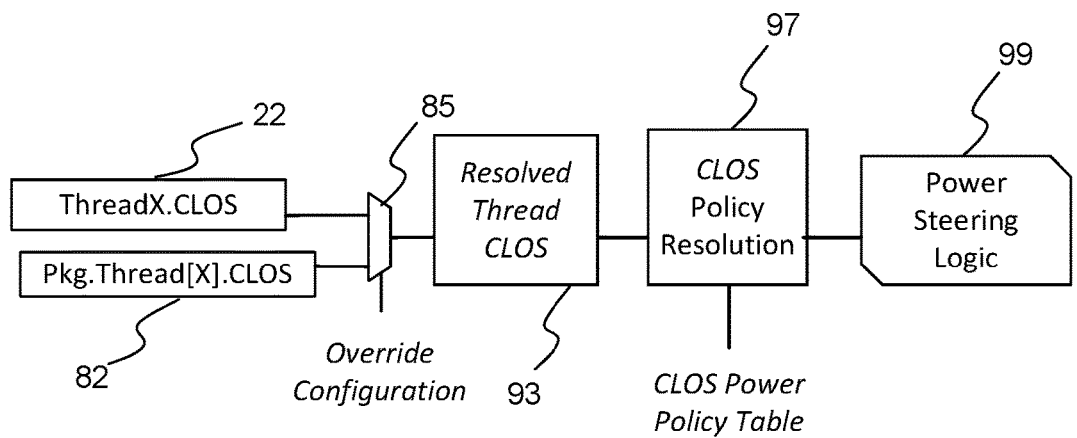
FIG. 3 is a block diagram of an example of class of service logic according to an embodiment.

Similarly, FIG. 3 depicts resolution of a case in which a core-level machine specific register 22 and a system-level machine specific register 82 both specify a CLOS. Both values from the illustrated registers 22 and 82 are passed into a multiplexer 85, which supplies an override configuration. The override configuration may be expressed as a resolved thread CLOS 93, which is sent to CLOS policy resolver 97. The CLOS policy resolver 97 may consult a CLOS policy table before sending the result to power steering logic 99.

Figure 4:
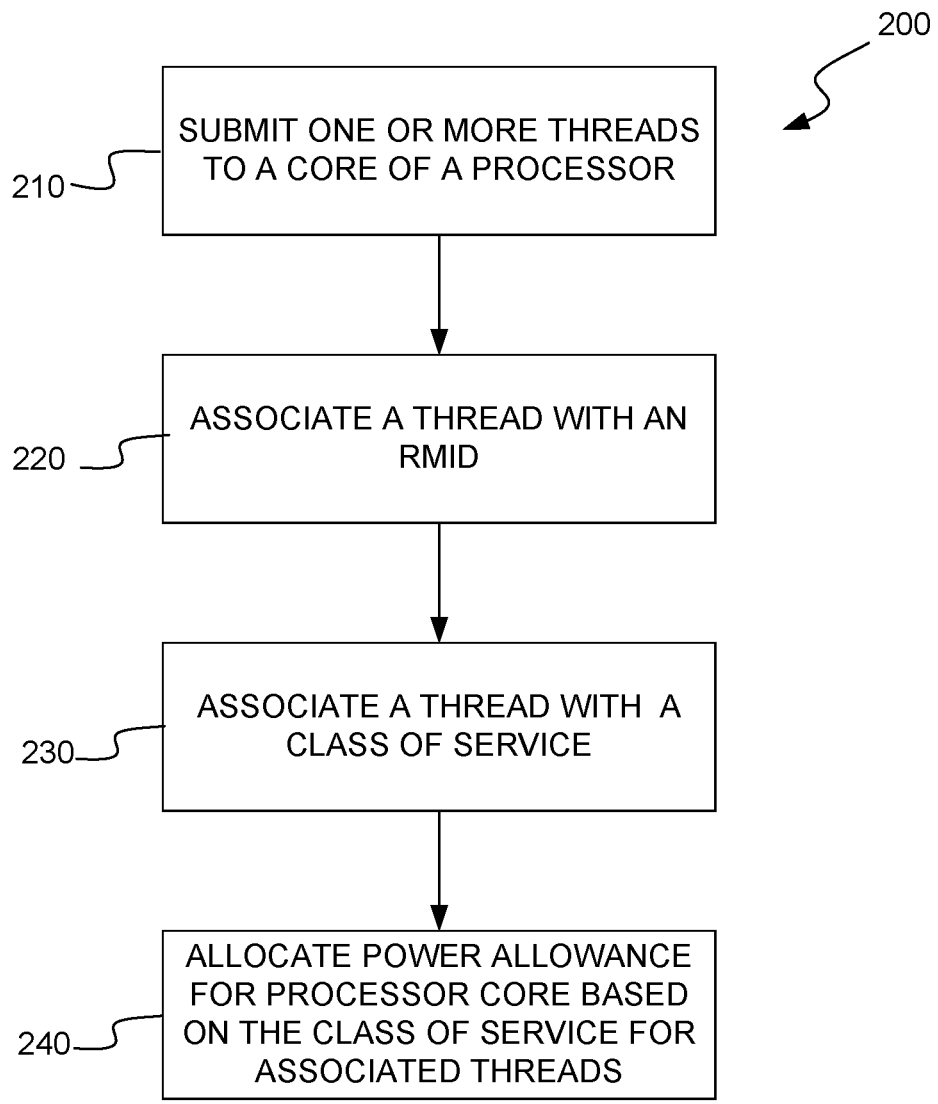
FIG. 4 is a flowchart of an example of a method according to an embodiment.

FIG. 4 shows an overview of a method 200 of dynamic load balancing according to an embodiment. The method 200 may generally be implemented in processor such as, for example, the processor 20 (FIG. 1), already discussed. More particularly, the method 200 may be implemented in one or more modules as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof. For example, computer program code to carry out operations shown in method 200 may be written in any combination of one or more programming languages, including an object oriented programming language such as JAVA, SMALLTALK, C++ or the like and conventional procedural programming languages, such as the "C" programming language or similar programming languages.

Illustrated processing block 210 provides for submitting one or more threads to a core of a processor. With continuing reference to FIGS. 1 and 4, the core may be core 24 that is depicted with two threads. Illustrated processing block 220 associates a thread with an RMID. Block 220 may conduct the thread association through the machine specific register 22. The RMID may perform monitoring operations on a thread that may be reported to a power control unit such as, for example, the PCU 50.

Illustrated processing block 230 associates a thread with a CLOS. Various levels may be provided for the CLOS indicating the priority of the thread and the comparative importance of resource allocation to the thread. A thread with a high priority CLOS may be allocated more power by the PCU 50. Illustrated processing block 240 allocates power to be consumed by a processor core based on the class of service for the thread. While the PCU 50 may perform global allocation of power resources, the local PCL 60 may enforce the power allocation to a processor core.

ADDITIONAL NOTES AND EXAMPLES

Example 1 may include a power control system comprising one or more processors, each processor having one or more cores, each core configured to process one or more application threads, each core including a machine specific register having logic, implemented in one or more of configurable logic or fixed functionality logic hardware, to facilitate thread association with a resource monitor and a class of service, a power control unit to a vary power allocation to a core according to the associated class of service, and communication fabric between the one or more processors and the power control unit.

Example 2 may include the system of example 1, further comprising a system-level machine specific register.

Example 3 may include the system of example 1 or 2 further comprising power steering logic in the power control unit to allocate power to the one or more processor cores.

Example 4 may include the system of any of examples 1-3, wherein the core is configured such that a dynamic change in thread class of service does not interrupt processing of the thread.

Example 5 may include the system of any of examples 1-4, wherein the power control unit balances synchronous workloads.

Example 6 may include a computer apparatus comprising a processor having one or more cores, each core configured to process one or more application threads, a machine specific register within the core having logic, implemented in one or more of configurable logic or fixed functionality logic hardware, to facilitate thread association with a resource monitor and a class of service, and core power control logic to draw varying levels of power according to the associated class of service.

Example 7 may include the apparatus of example 6, wherein the core power logic is configured to receive power instructions from a system power control unit.

Example 8 may include the apparatus of example 6 or 7, wherein each core is configured to process two or more threads.

Example 9 may include the apparatus of any of examples 6-8, wherein the core is configured such that a dynamic change in class of service of a thread does not interrupt processing of the thread.

Example 10 may include the apparatus of any of examples 6-9, wherein each core includes a machine specific register.

Example 11 may include a method of dynamic load balancing comprising dividing an application into threads, each thread to be submitted to a core in a processor, associating a thread with a resource monitor through a machine specific register, associating the thread with a class of service through the machine specific register, and allocating power consumed by the processor core based on the class of service for the thread.

Example 12 may include the method of example 11, wherein a change in the class of service of the thread does not interrupt processing of the thread.

Example 13 may include the method of example 11 or 12, wherein multiple threads subscribe to a single resource monitor.

Example 14 may include the method of any of examples 11-13, further comprising reporting resource monitoring and the class of service to a power control unit.

Example 15 may include the method of any of examples 11-14, further comprising changing a frequency of the processor according to a change in the class of service.

Example 16 may include at least one computer readable storage medium comprising a set of instructions, wherein the instructions, when executed, cause a processor to allocate a thread for processing to each core in the processor, associate each thread with a resource monitor through a machine specific register, associate each thread with a class of service through the machine specific register; and allocate the power consumed by the processor core based on the class of service for the thread.

Example 17 may include the medium of example 16, wherein the instructions, when executed change in class of service of a thread without interrupting processing of the thread.

Example 18 may include the medium of example 16 or 17, wherein multiple threads may subscribe to a single resource monitor.

Example 19 may include the medium of any of examples 16-18, wherein the instructions, when executed, report resource monitoring and class of service to a power control unit.

Example 20 may include the medium of any of examples 16-19, wherein the instructions, when executed change a frequency of the processor according to a change in class of service.

Example 21 may include an apparatus for dynamic load balancing comprising, means for dividing an application into threads, each thread to be submitted to a core in a processor, means for subscribing a thread to a resource monitor through a machine specific register, means for subscribing the thread to a class of service through the machine specific register, and means for allocating power consumed by the processor core based on the class of service for the thread.

Example 22 may include the apparatus of example 21, further comprising means for changing a class of service of a thread with interrupting processing of the thread.

Example 23 may include the apparatus of example 21 or 22, wherein multiple threads may subscribe to a single resource monitor.

Example 24 may include the apparatus of any of examples 21-23, further comprising means for reporting resource monitoring and class of service to a power control unit.

Example 25 may include the apparatus of any of examples 21-24, further comprising means for changing a frequency of the processor according to a change in class of service.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The terms "coupled" and "communicating" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A power control system comprising:
   one or more processors, each processor having one or more cores, each core configured to process one or more application threads;
   each core including a machine specific register having logic, implemented in one or more of configurable logic or fixed-functionality logic hardware, to facilitate thread association with:
      a resource monitor that is to identify a core-level power, wherein the core-level power is one or more of a power measurement associated with a respective application thread of the one or more application threads that is to be processed by the core or a power estimate associated with the respective application thread, and
      a core-level class of service of the respective application thread,
   wherein a first application thread from the one or more application threads is associated with a first of the one or more core-level classes of service;
   a power control unit to receive the one or more core-level classes of service and the one or more core-level powers, wherein the power control unit includes a system-level machine specific register that is to identify a first system-level class of service of the first application thread, wherein the power control unit is to:
   select the first system-level class of service or the first core-level class of service as a resolved class of service of the first application thread, and
   vary power allocation to the one or more cores according to the resolved class of service and at least one of the one or more core-level powers; and
   communication fabric between the one or more processors and the power control unit.

2. The system of claim 1,
   wherein the first application thread is associated with a first of the one or more core-level powers,
   wherein the system-level machine specific register is to identify a first system-level power of the first application thread, wherein the first system-level power is one or more of a power measurement of the first application thread or a power estimate of the first application thread, and
   wherein the power control unit is to select the first system-level power or the first core-level power as a resolved power value.

3. The system of claim 1, further comprising power steering logic in the power control unit to allocate power to the one or more cores.

4. The system of claim 1, wherein at least one of the one or more cores is configured such that a dynamic change in the core-level class of service of a thread of the one or more application threads processed by the at least one of the one or more cores does not interrupt processing by the at least one of the one or more cores.

5. The system of claim 1, wherein the power control unit balances synchronous workloads.

6. The system of claim 2, wherein the resolved class of service is adjusted according to the resolved power value.

7. A computer apparatus comprising:
   a processor having one or more cores, each core configured to process one or more application threads;
   a machine specific register, within a first of the one or more cores, having logic, implemented in one or more of configurable logic or fixed-functionality logic hardware, to facilitate thread association with:
      a resource monitor that is to identify a core-level power, wherein the core-level power is to be associated with a time stamp, wherein the core-level power is one or more of a power measurement associated with a first of the one or more application threads that is to be processed by the first core or a power estimate associated with the first application thread; and
      a core-level class of service of the first application thread, wherein the core-level class of service correlates to a frequency of the first core to facilitate dynamic load balancing across the one or more cores, wherein the core-level power and the core-level class of service are to be provided to a system power control unit; and
   core power control logic to draw varying levels of power according to a power allocation, received from the system power control unit, that is associated with the core-level class of service and the core-level power.

8. The apparatus of claim 7, wherein the power allocation received by the core power control logic is to be associated with an adjustment of the core-level class of service by the system power control unit.

9. The apparatus of claim 7, wherein each core is configured to process two or more threads.

10. The apparatus of claim 7, wherein the first core is configured such that a dynamic change in the core-level class of service of the first application thread does not interrupt processing of the first application thread.

11. The apparatus of claim 7, wherein each core includes a machine specific register.

12. A method comprising:
dividing an application into threads to be executed by cores of one or more processors;
submitting each thread to a respective one of the cores;
associating a first of the threads with a resource monitor, that is to identify a core-level power, through a machine specific register of a first of the cores that processes the first thread, wherein the core-level power is one or more of a power measurement associated with the first thread or a power estimate associated with the first thread, wherein the core-level power is to be associated with a time stamp;
associating the first thread with a core-level class of service through the machine specific register of the first core, wherein the core-level class of service correlates to a frequency of the first core to facilitate dynamic load balancing across the cores;
providing the core-level power and the core-level class of service to a system power control unit; and
allocating, at the system power control unit, a power allowance to the first core based on the core-level class of service and the core-level power.

13. The method of claim 12, wherein a change in the core-level class of service of the first thread does not interrupt processing of the first thread.

14. The method of claim 12, wherein multiple threads subscribe to a single resource monitor.

15. The method of claim 12, further comprising changing a frequency of the one or more processors according to a change in the core-level class of service.

16. At least one non-transitory computer readable storage medium comprising a set of instructions, wherein the instructions, when executed, cause a processor to:

divide an application into threads to be executed by cores of the processor;
allocate each thread for processing to a respective one of the cores;
associate a first of the threads with a resource monitor, that is to identify a core-level power, through a machine specific register of a first of the cores that is to process the first thread, wherein the core-level power is to be associated with a time stamp, wherein the core-level power is one or more of a power measurement associated with the first thread or a power estimate associated with the first thread;
associate the first thread with a core-level class of service through the machine specific register of the first core, wherein the core-level class of service correlates to a frequency of the first core to facilitate dynamic load balancing across the cores;
provide the core-level power and the core-level class of service to a system power control unit; and
allocate, at the system power control unit, a power allowance to the first core based on the core-level class of service and the core-level power.

17. The non-transitory medium of claim 16, wherein the instructions, when executed change the core-level class of service without interrupting processing of the first thread.

18. The non-transitory medium of claim 16, wherein multiple threads subscribe to a single resource monitor.

19. The non-transitory medium of claim 16, wherein the instructions, when executed change a frequency of the processor according to a change in the core-level class of service.

* * * * *